(12) United States Patent
Lee et al.

(10) Patent No.: US 8,212,394 B2
(45) Date of Patent: Jul. 3, 2012

(54) REMOTE CONTROLLABLE POWER OUTLET APPARATUS WITH GROUPING CAPABILITY AND REMOTE CONTROL GROUPING METHOD THEREOF

(75) Inventors: Yu-Lung Lee, Nanjhuang Township, Miaoli County (TW); Ming-Chou Kuo, Taipei (TW)

(73) Assignee: Powertech Industrial Co., Ltd., Chung Ho (TW)

( * ) Notice: Subject to any disclaimer, the term of this patent is extended or adjusted under 35 U.S.C. 154(b) by 473 days.

(21) Appl. No.: 12/417,956

(22) Filed: Apr. 3, 2009

(65) Prior Publication Data
US 2010/0164299 A1 Jul. 1, 2010

(30) Foreign Application Priority Data
Dec. 31, 2008 (TW) .............................. 97151572 A

(51) Int. Cl.
*H02J 3/14* (2006.01)
(52) U.S. Cl. ......................................................... 307/38
(58) Field of Classification Search ...................... 307/38
See application file for complete search history.

(56) References Cited

U.S. PATENT DOCUMENTS

| | | | |
|---|---|---|---|
| 6,211,581 B1 * | 4/2001 | Farrant | 307/117 |
| 6,741,442 B1 * | 5/2004 | McNally et al. | 361/166 |
| 7,638,896 B2 * | 12/2009 | Ozaki | 307/9.1 |
| 7,701,086 B2 * | 4/2010 | McClurkan | 307/38 |
| 7,843,081 B2 | 11/2010 | Lim | |
| 2005/0036258 A1 * | 2/2005 | Ma et al. | 361/103 |
| 2008/0309164 A1 | 12/2008 | Lim | |
| 2009/0146494 A1 * | 6/2009 | Mori et al. | 307/38 |

FOREIGN PATENT DOCUMENTS

CN 2850053 Y 12/2006

* cited by examiner

*Primary Examiner* — Hal Kaplan
(74) *Attorney, Agent, or Firm* — C. G. Mersereau; Nikolai & Mersereau, P.A.

(57) ABSTRACT

A remote controllable power outlet apparatus with grouping capability and a remote control grouping method thereof, includes a microprocessor, a communication module, a power protection and control module, a grouping unit, at least a controllable socket set, a switch, and an original remote control which belongs and corresponds to the remote controllable power outlet apparatus. Therein the switch is coupled between the microprocessor, the power protection and control module, and the controllable socket set, and the switch is for controlling whether or not the controllable socket set provides power. When the original remote control is plugged into the grouping unit, the remote controllable power outlet apparatus then activates a remote control grouping function, and the remote controllable power outlet apparatus can be controlled by another remote control other then the original remote control.

12 Claims, 6 Drawing Sheets

REMOTE CONTROLLABLE POWER OUTLET APPARATUS WITH GROUPING CAPABILITY AND REMOTE CONTROL GROUPING METHOD THEREOF

BACKGROUND OF THE INVENTION

1. Field of the Invention

The present invention relates to a power outlet apparatus and a control method thereof, in particular, to a remote controllable power outlet apparatus with grouping capability and a remote control grouping method thereof.

2. Description of Related Art

A traditional on/off type power outlet apparatus, such as a power extension power strip, generally relies on a single on/off switch pressed by the user to control whether or not the power outlet apparatus provides power. However, as the technology advances and wireless remote control technology matures, some wireless remote control application being used in power outlet apparatus can be seen. These traditional remote controllable power outlet apparatus may be controlled by a remote control, and through the operation of the remote control, the user may control whether or not the traditional remote controllable power outlet apparatus provides power. Therefore, a traditional remote controllable power outlet apparatus is more convenient than a plain traditional power outlet apparatus.

However, a traditional remote controllable power outlet apparatus may only be controlled by a single remote control, which is the original remote control belonging and corresponding to the traditional remote controllable power outlet apparatus, and the integration of controlling multiple remote controllable power outlet apparatus with one remote control cannot be achieved. Therefore, each remote controllable power outlet apparatus must be controlled only by its respective original remote control in order to provide or shut-off power, which may be inconvenient.

SUMMARY OF THE INVENTION

An object of the present invention is to provide a remote controllable power outlet apparatus with grouping capability and a remote control grouping method thereof. Therein the remote control grouping function of the remote controllable power outlet apparatus is according to the status of the original remote control which belongs and corresponds to the remote controllable power outlet apparatus. The activation of the remote control grouping function means that another remote control other than the original remote control may be used to wirelessly control whether or not the remote controllable power outlet apparatus provides power, thereby achieving the function of controlling multiple remote controllable power outlet apparatus with a single common remote control.

In order to achieve the above object, a remote controllable power outlet apparatus according to an embodiment of the present invention is provided, the apparatus includes: a microprocessor, which is the signal and data processing center; a communication module, coupled to the microprocessor, for receiving a remote control signal, and the communication module may be a wireless communication module; a power protection and control module, coupled to the microprocessor, and the power protection and control module including a surge protection module, a magnetic interference protection module, and a power conversion module, for applying power protection and AC/DC power conversion, so as to control and convert a received input power and protect those electronic devices connected to the remote controllable power outlet apparatus, and provide the required power to the electronic devices; a grouping unit, coupled to the microprocessor, and the grouping unit includes a receiving socket and an activation switch, so that the original remote control may be plugged into the receiving socket and activate the activation switch, whereby whether or not the remote control grouping function of the remote controllable power outlet apparatus is activated may be determined according to the activation of the activation switch.

Furthermore, the remote controllable power outlet apparatus includes at least one controllable socket set, coupled to the microprocessor and the power protection and control module, and the controllable socket set includes a plurality of controllable power sockets so that electronic devices requiring power may connect with the controllable socket set to receive power; and a switch, coupled between the microprocessor, the power protection and control module, and the controllable socket set, so as to control whether or not the controllable socket set provides power. When the original remote control has been placed, plugged, or slid into the receiving socket and activates the activation switch, the remote controllable power outlet apparatus then activates the remote control grouping function, so that another remote control other than the original remote control may be use to control the remote controllable power outlet apparatus.

According to an embodiment of the present invention, a remote control grouping method for a remote controllable power outlet apparatus is provided, the remote controllable power outlet apparatus includes a grouping unit and an original remote control which belongs and corresponds to the remote controllable power outlet apparatus. The method includes: receiving a remote control signal; determining the remote control signal and the status of the grouping unit; and performing remote control grouping according to the determination result. Therein the determination of the remote control signal determines whether or not the remote control signal is sent from the original remote control; and if the remote control signal is sent from the original remote control, then the remote controllable power outlet apparatus controls at least one controllable socket set to provide power or stop providing power according to the remote control signal sent from the original remote control. Furthermore, the determination of the status of the grouping unit determines whether or not the original remote control has been plugged into a receiving socket of the grouping unit and activates an activation switch of the grouping unit, thereby activating a remote control grouping function of the remote controllable power outlet apparatus, so that another remote control other than the original remote control may control the remote controllable power outlet apparatus to either provide power or stop providing power to electronic devices connected to the remote controllable power outlet apparatus.

The determination of whether or not the original remote control has been plugged within the grouping unit may be used to decide whether or not the remote controllable power outlet apparatus may be controlled by another remote control other than the original remote control. Therefore the user may perform remote control grouping for one or more remote controllable power outlet apparatus by connected the corresponding original remote control therewith, so that a single remote control may control these remote controllable power outlet apparatus. (Therein, simply by unplugging the original remote control, the remote control grouping is cancelled.) Thus by performing the method of the present invention, the user does not require using many different remote controls to control a plurality of remote controllable power outlet apparatuses, so that the convenience and practicality of using the remote controllable power outlet apparatus is increased.

When the original remote control has been placed, plugged, or slid into the receiving socket of the grouping unit, the remote controllable power outlet apparatus may begin to charge the original remote control. In other words, when the original remote control is low in power, it may be connected within the grouping unit of the remote controllable power outlet apparatus, and the remote controllable power outlet apparatus is then set to interact with another remote control for being control.

Additionally, the remote controllable power outlet apparatus may include a timer module for the user to set the length of time that power may be provided, wherein the length of time set may be the time until power starts to be provided, or the length of time set may be the time until the provision of power is stopped. Thereby the flexibility and functionality of the remote controllable power outlet apparatus is increased.

Furthermore, on the remote control of the remote controllable power outlet apparatus, a display unit may be included, so as to display the operation status of a single or multiple remote controllable power outlet apparatus. Therein the operation status may include power supply status, timer status, power usage, on/off status, etc, so that those remote controllable power outlet apparatus may be monitored, and better control efficiency may be achieved.

The above-mentioned summary and subsequent detailed descriptions as well as appended drawings are all illustrations of approaches, means, and effects which are adopted by the present invention to achieve the prescribed purposes. Other objectives and advantages related to the present invention will be further elucidated in the following specification and diagrams. However, the appended drawings are for reference and illustration purpose only, and are not meant to limit the present invention.

DETAILED DESCRIPTION OF THE PREFERRED EMBODIMENTS

Figure 1:
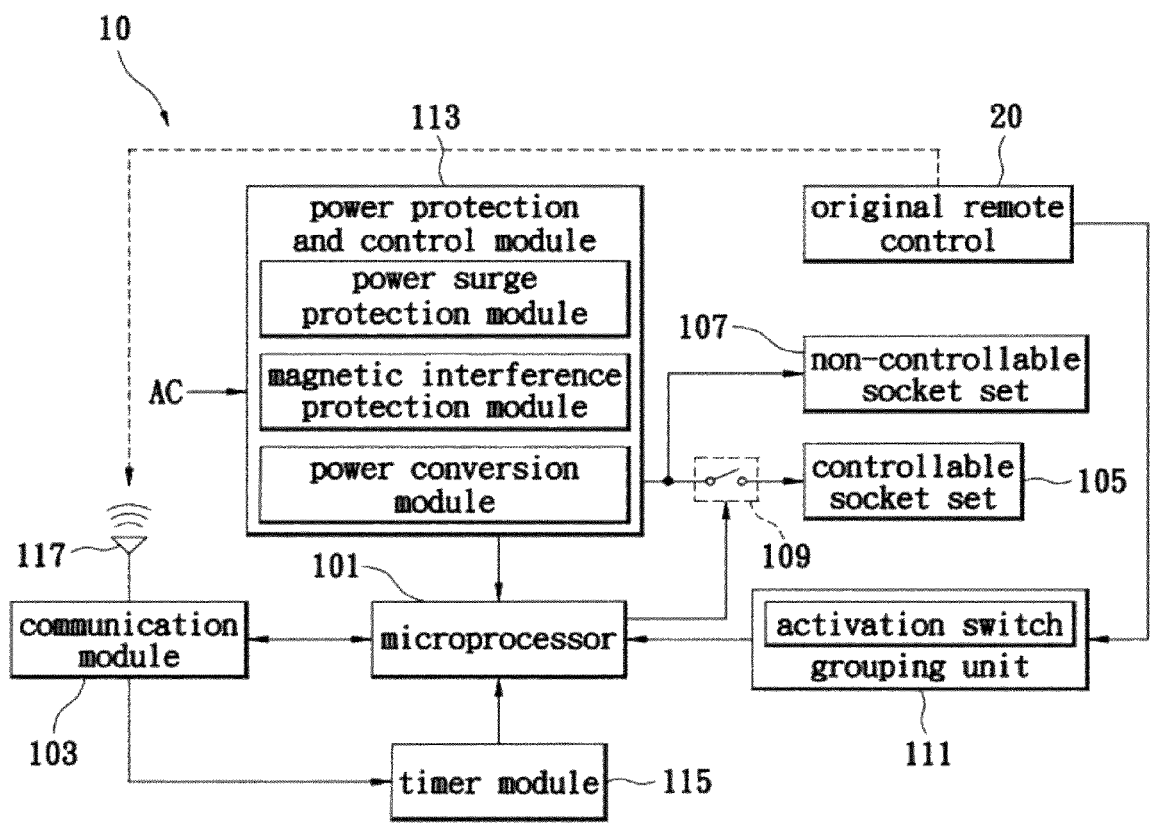
FIG. 1 is a functional block diagram of a remote controllable power outlet apparatus with grouping capability according to an embodiment of the present invention.

Please refer to FIG. 1, which shows a functional block diagram of a remote controllable power outlet apparatus 10 with grouping capability, the apparatus 10 includes: A microprocessor 101 which is the signal and data processing center. A communication module 103, coupled to the microprocessor 101, for receiving a remote control signal, wherein the communication module 103 may be a wireless communication module and includes an antenna 117. A grouping unit 111, coupled to the microprocessor 101, for determining whether or not to activate a remote control grouping function; wherein the grouping unit 111 includes an activation switch and a receiving socket so that an original remote control 20 which belongs and corresponds to the remote controllable power outlet apparatus 10 may be placed, plugged, or slid into the receiving socket and activating the activation switch. A power protection and control module 113, coupled to the microprocessor 101, for receiving an input power source AC and controlling the conversion of the input power source AC, so as to provide the required power to the microprocessor 101 and to electronic devices connected to the remote controllable power outlet apparatus 10; wherein the power protection and control module 113 includes a surge protection module, a magnetic interference protection module, and a power conversion module.

Referring to FIG. 1 again, the remote controllable power outlet apparatus 10 further includes at least one controllable socket set 105 coupled to the microprocessor 101 and the power protection and control module 113. The controllable socket set 105 includes a plurality of controllable power sockets so that electronic devices may connect with the controllable socket set 105 to receive required power supply. A switch 109 is coupled between the microprocessor 101, the power protection and control module 113, and the controllable socket set 105, so as to control whether or not the controllable socket set 105 provides the required power. At least one non-controllable socket set 107 coupled with the power protection and control module 113 includes a plurality of non-controllable power sockets for providing a continuous power source that may not be remotely turned-on or shut-off. Therefore, the electronic devices requiring a continuous power supply may connect with the non-controllable socket set to continuously receive the required power. And a timer module 115 coupled to the microprocessor 101 is for setting the length of time the controllable socket set 105 may provide the required power according to the requirement of the user, wherein the length of time set may be a time period lasting until the controllable socket set 105 starts to automatically provide the required power, or the length of time set may be a time period lasting until the controllable socket set 105 stops providing the required power.

When the original remote control 20 has been placed, plugged, or slid into the receiving socket and an activation switch is turned on, the remote controllable power outlet apparatus 10 then activates the remote control grouping function, so that another remote control other than the original remote control 20 may be used to control the remote controllable power outlet apparatus 10. According to various needs of the user and various usage locations for the apparatus 10, the apparatus 10 may have different forms of embodiments, such as strip, block, wall-tap, rack-mount, or desktop.

Figure 2:
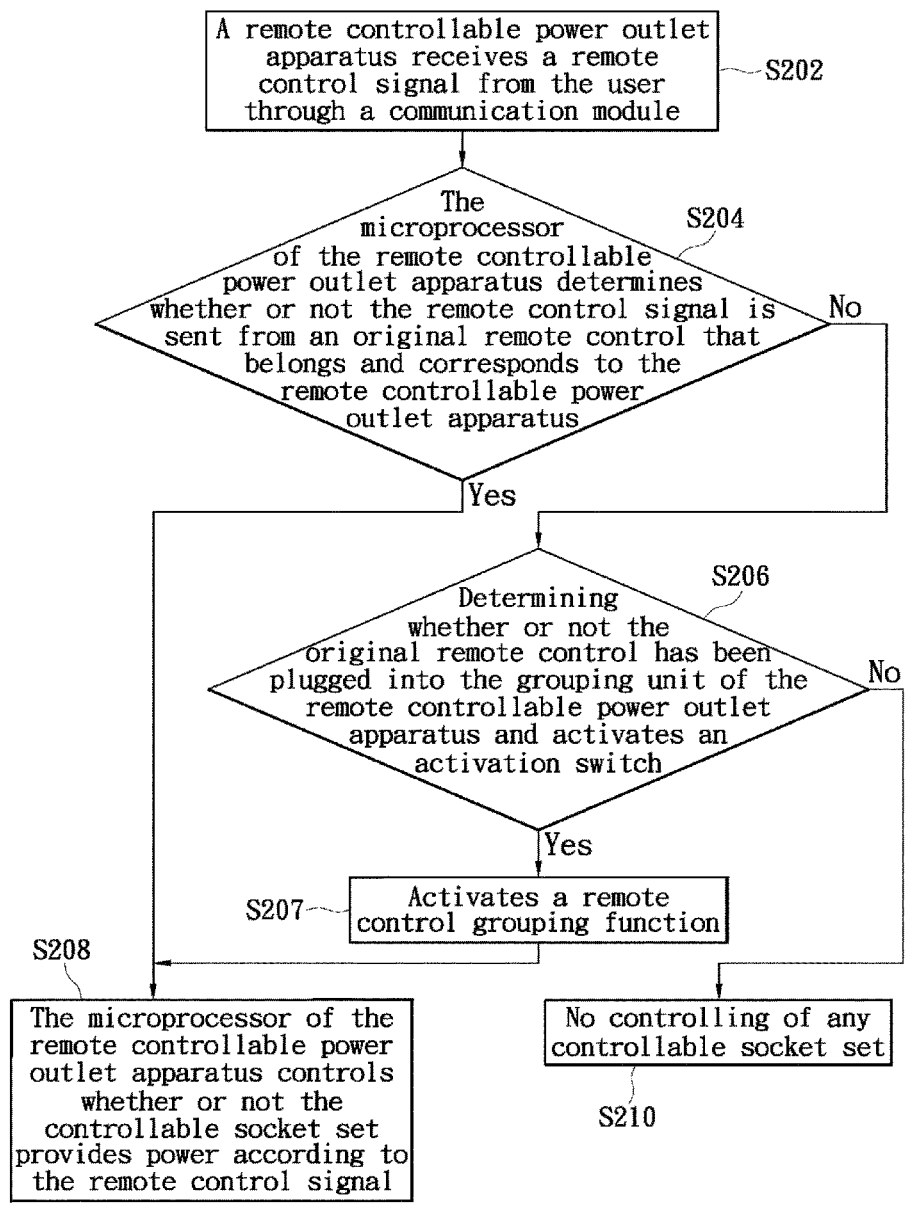
FIG. 2 is a flowchart of a remote control grouping method of the remote controllable power outlet apparatus according to an embodiment of the present invention.

Please refer to FIG. 2 in conjunction with FIG. 1 for explanation, wherein FIG. 2 shows a flowchart of a remote control grouping method for a remote controllable power outlet apparatus 10. The method is applicable to the remote controllable power outlet apparatus 10, wherein there is a remote control which belongs and corresponds to the remote controllable power outlet apparatus 10 and is referred to as an original remote control 20. The control method includes the following steps: the remote controllable power outlet apparatus 10 receives a remote control signal from the user through a communication module 103 (S202); the microprocessor 101 of the remote controllable power outlet apparatus 10 determines whether or not the remote control signal is sent from the original remote control 20 that belongs and corresponds to the remote controllable power outlet apparatus 10 (S204). If the determination in step S204 is yes, such that the remote control signal is sent from the original remote control 20, then the microprocessor 101 of the remote controllable power outlet apparatus 10 controls whether or not a controllable socket set 105 of the remote controllable power outlet apparatus 10 provides power (S208); and if the determination in step S204 is no, such that the remote control signal is not sent from the original remote control 20, then the microprocessor 101 further determines whether or not the original remote control 20 has been plugged into the grouping unit 111 of the remote controllable power outlet apparatus 10 and an activation switch is correspondingly activated by the original remote control 20 (S206).

Furthermore, if the determination in step 206 is yes, then the remote controllable power outlet apparatus 10 activates a remote control grouping function (S207), then the microprocessor 101 of the remote controllable power outlet apparatus 10 controls whether or not the controllable socket set 105 provides power according to the remote control signal (S208); and if the determination in step 206 is no (which indicates the remote control grouping function has not been activated) and the previous determined fact that the remote control signal is not sent from the original remote control 20 still remains true, this particular remote control signal is to be ignored, and there is no controlling for any controllable socket set 105 (S210).

Figure 3:
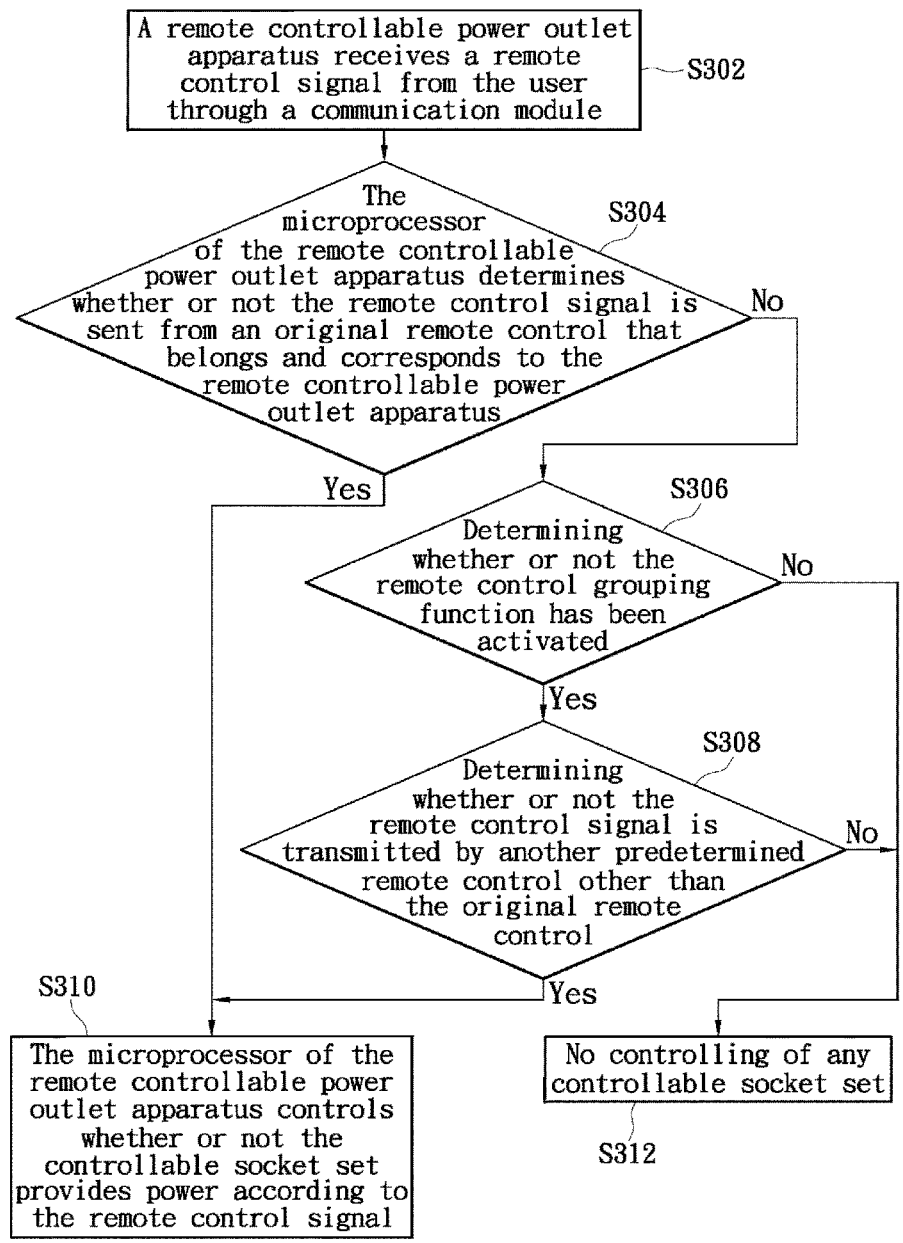
FIG. 3 is a flowchart of a remote control grouping method of the remote controllable power outlet apparatus according to another embodiment of the present invention.

Please refer to FIG. 3 in conjunction with FIG. 1, FIG. 3 shows a flowchart of a remote control grouping method of a remote controllable power outlet apparatus 10. The method is also applicable to the remote controllable power outlet apparatus 10, wherein there is a remote control belonging and corresponding to the remote controllable power outlet apparatus 10 and is referred to as an original remote control 20. The control method includes the following steps: the remote controllable power outlet apparatus 10 receives a remote control signal from the user through a communication module 103 (S302); the microprocessor 101 of the remote controllable power outlet apparatus 10 determines whether or not the remote control signal is sent from the original remote control 20 that belongs and corresponds to the remote controllable power outlet apparatus 10 (S304); if the determination in step S304 is yes the microprocessor 101 of the remote controllable power outlet apparatus 10 controls whether or not a controllable socket set 105 of the remote controllable power outlet apparatus 10 provides power according to the remote control signal (S310); if the determination in step S304 is no microprocessor 101 further determines whether or not the remote control grouping function has been activated (S306).

Furthermore, if the determination in step S306 is no indicative of the remote control grouping function not being activated, the controllable socket set 105 may not be controlled (S312); and if the determination in step S306 is yes indicative of the remote control grouping function being activated, whether the remote control signal is transmitted by another remote control other than the original remote control 20 is determined, with another remote control being a predetermined remote control configured to be the primary remote control when the remote control grouping function has been activated (S308). In other words, step S308 determines whether or not the remote control signal is transmitted by another remote control such as the primary remote control that has been configured through a learning mode. As such, another remote control is able to control each of the remote controllable power outlet apparatus 10 which has its remote control grouping function activated. If the determination in step S308 is yes, then the microprocessor 101 of the remote controllable power outlet apparatus 10 controls whether or not the controllable socket set 105 provides power according to the remote control signal (S310); and if the determination in step S308 is no, which indicates the controllable socket set 105 is not controlled (S312).

Therein the learning mode may be performed by simultaneously pressing a grouping button on the remote controllable power outlet apparatus 10 and a configuration button on the remote control which is meant to be set as the primary remote control, thereby the two devices achieve mutual identification. Then the remote controllable power outlet apparatus 10 may confirm and set this remote control as the primary remote control, whereby this remote control may be used for remotely controlling the remote controllable power outlet apparatus 10. It is worth noting that the configuration button and the grouping button are not shown, since buttons to be used for learning mode is well known to those skilled in the art.

Figure 4A:
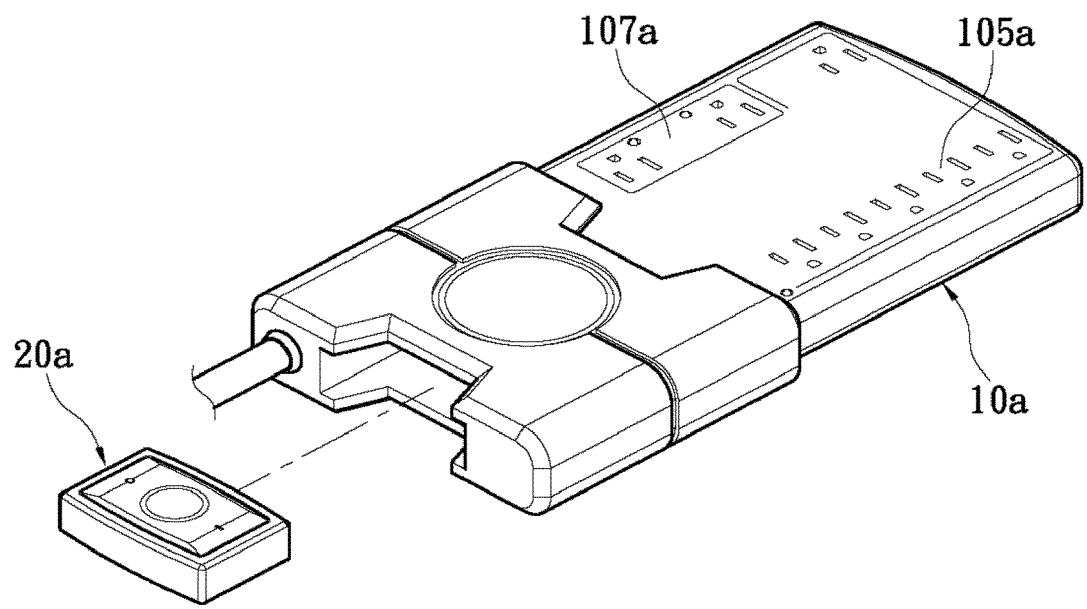
FIG. 4A and FIG. 4B shows schematic operation diagrams of the remote controllable power outlet apparatus with grouping capability according to an embodiment of the present invention.
Figure 4B:
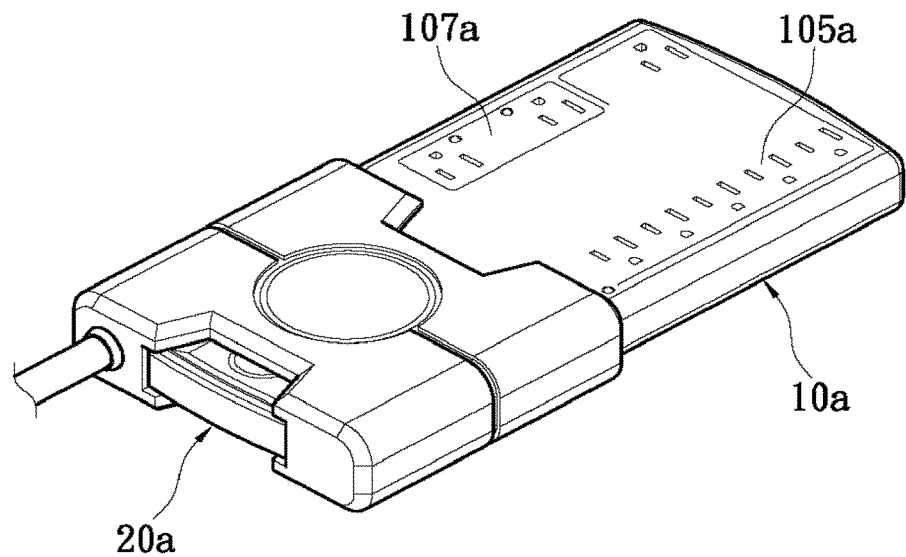

Please refer to FIGS. 4A-4B in conjunction with FIG. 1, which shows schematic operation diagrams of the remote controllable power outlet apparatus with grouping capability. Therein the remote controllable power outlet apparatus 10a is in strip form. An original remote control 20a belonging and corresponding to the remote controllable power outlet apparatus 10a is shown in FIG. 4A. The remote controllable power outlet apparatus 10a further includes a controllable socket set 105a, and a non-controllable socket set 107a. In FIG. 4A, the original remote control 20a has not been connected within the remote controllable power outlet apparatus 10a, so that the remote control grouping function has not been activated, therefore the remote controllable power outlet apparatus 10a may currently only be controlled by the original remote control 20a. Next refer to FIG. 4B, the original remote control 20a has been connected with the remote controllable power outlet apparatus 10a, so that the remote control grouping function has been activated, therefore the controllable socket set 105a may now be controlled by another remote control (i.e. such as a remote control that has underwent learning mode and has been identified with the remote controllable power outlet apparatus 10a) other than the original remote control 20a.

Figure 5A:
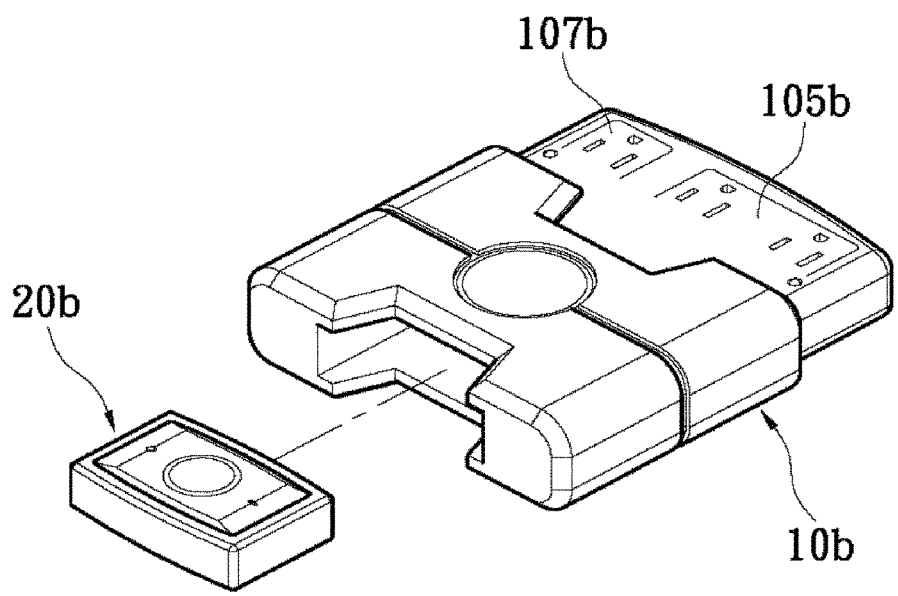
FIG. 5A and FIG. 5B shows schematic operation diagrams of the remote controllable power outlet apparatus with grouping capability according to another embodiment of the present invention.
Figure 5B:
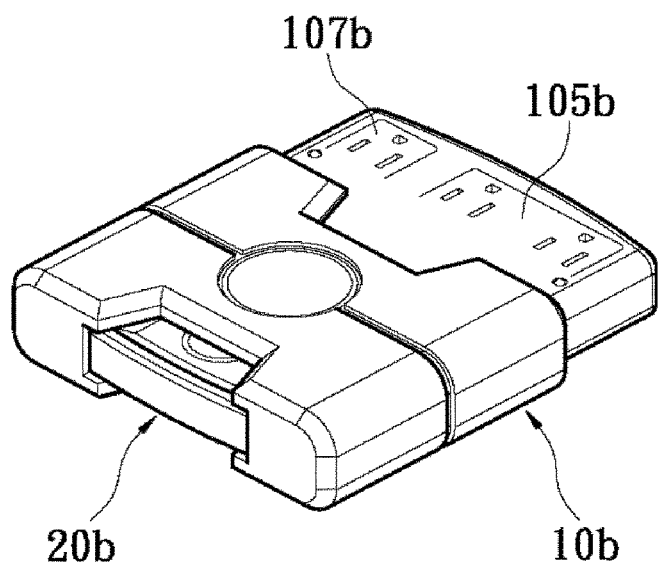

Please refer to FIGS. 5A-5B in conjunction with FIG. 1, which shows schematic operation diagrams of the remote controllable power outlet apparatus with grouping capability. Therein the remote controllable power outlet apparatus 10b is in wall-tap form. An original remote control 20b belonging and corresponding to the remote controllable power outlet apparatus 10b is shown in FIG. 5A. The remote controllable power outlet apparatus 10b further includes a controllable socket set 105b, and a non-controllable socket set 107b. In FIG. 5A, the original remote control 20b has not been connected within the remote controllable power outlet apparatus 10b, so that the remote control grouping function has not been activated, therefore the remote controllable power outlet apparatus 10b may currently only be controlled by the original remote control 20b. Next refer to FIG. 5B, the original remote control 20b has been connected with the remote controllable power outlet apparatus 10b, so that the remote control grouping function has been activated, therefore the controllable socket set 105b may now be controlled by another remote control (i.e. such as a remote control that has underwent learning mode and has been identified with the remote controllable power outlet apparatus 10b) other than the original remote control 20b.

Figure 6A:
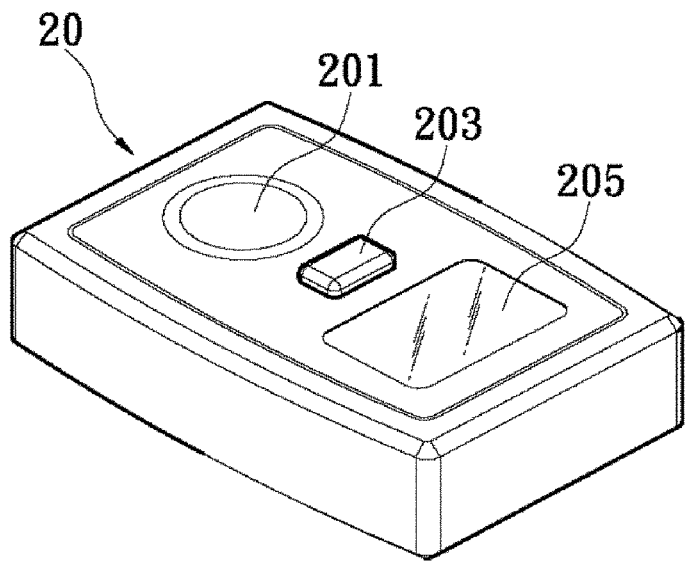
FIG. 6A is a schematic diagram of an original remote control of the remote controllable power outlet apparatus according to an embodiment of the present invention.

Next please refer to FIG. 6A in conjunction with FIG. 1, FIG. 6A shows a schematic diagram of an original remote control 20 of the remote controllable power outlet apparatus 10. The original remote control 20 includes a remote control button 201 for remotely controlling the controllable socket set 105 of the remote controllable power outlet apparatus 10, and a timer button 203 for the user to press and set the length of time during which the controllable socket set 105 may provide power. In one implementation, the length of time lasts until the controllable socket set 105 begins to provide power. In another implementation, the length of time lasts until the controllable socket set 105 stops providing power. The original remote control 20 may further include a timer display unit 205 for displaying the length of time set by the user.

Figure 6B:
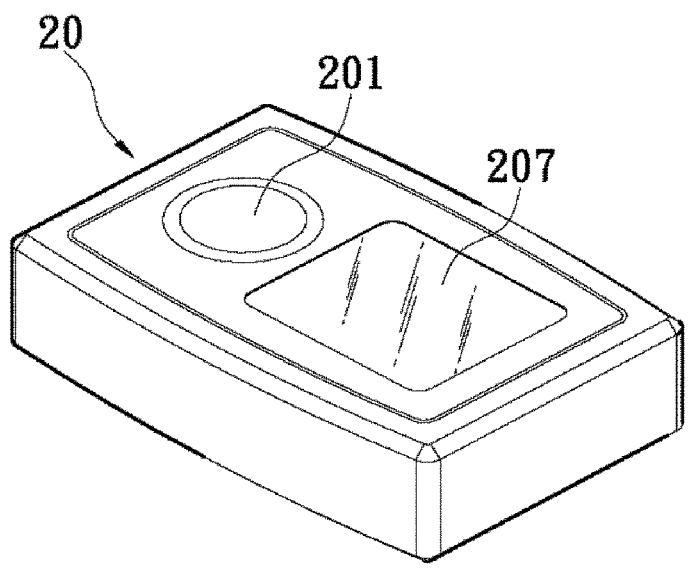
FIG. 6B is a schematic diagram of an original remote control of the remote controllable power outlet apparatus according to another embodiment of the present invention.

Next please refer to FIG. 6B in conjunction with FIG. 1, which shows a schematic diagram of an original remote control 20 of the remote controllable power outlet apparatus 10. The original remote control 20 includes a remote control button 201 for remote controlling the controllable socket set 105 of the remote controllable power outlet apparatus 10; and a display unit 207 for displaying the operation status of a single or multiple remote controllable power outlet apparatus 10. Therein the operation status may include power supply status, timer status, power usage, on/off status, etc, so that the remote controllable power outlet apparatus 10 may be monitored.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A remote controllable power outlet apparatus comprising:
   a microprocessor;
   a communication module, coupled to the microprocessor, for receiving a remote control signal;
   a grouping unit, coupled to the microprocessor and having an activation switch, for selectively activating a remote control grouping function according to whether or not an original remote control has been received by the grouping unit and the activation switch has been turned on;
   at least one controllable socket set coupled to the microprocessor, wherein the controllable socket set includes a plurality of controllable power sockets allowing for an electronic device to be connected with the controllable socket set; and
   a switch, coupled between the microprocessor and the controllable socket set, so as to control the controllable socket set to provide a required power.

2. The remote controllable power outlet apparatus according to claim 1, wherein the communication module is a wireless communication module.

3. The remote controllable power outlet apparatus according to claim 1, further comprising:
   a power protection and control module, coupled to the microprocessor, for receiving an input power source and controlling a conversion of the input power source, so as to provide the required power for operations of the remote controllable power outlet apparatus and the electronic device;
   wherein the power protection and control module includes a power surge protection module for protecting the electronic device connected to the remote controllable power outlet apparatus.

4. The remote controllable power outlet apparatus according to claim 3, wherein the power protection and control module includes a magnetic interference protection module for protecting the electronic device connected to the remote controllable power outlet apparatus.

5. The remote controllable power outlet apparatus according to claim 3, wherein the power protection and control module includes a power conversion module, for performing an AC/DC conversion for the input power source.

6. The remote controllable power outlet apparatus according to claim 1, wherein the grouping unit further comprises:
   a receiving socket, wherein the receiving socket is for receiving the original remote control that belongs and corresponds to the remote controllable power outlet apparatus.

7. The remote controllable power outlet apparatus according to claim 6, wherein the remote control grouping function enables the controllable socket set of the remote controllable power outlet apparatus to be controlled by another remote control other than the original remote control.

8. The remote controllable power outlet apparatus according to claim 1, further comprising:
   at least one non-controllable socket set coupled with the power protection and control module, wherein the non-controllable socket set includes a plurality of non-controllable power sockets, for providing a continuous power source, with the non-controllable power sockets not remotely turned on or off, so that the electronic device connected with the non-controllable socket set receives the required power continuously.

9. The remote controllable power outlet apparatus according to claim 1, further comprising:
   a timer module, coupled to the microprocessor, for setting a length of time during which the controllable socket set provides the required power according to a user requirement, wherein the length of time lasts until the controllable socket set starts to automatically provide the required power, or lasts until the controllable socket set stops providing the required power.

10. A remote control grouping method for a remote controllable power outlet apparatus, the remote controllable power outlet apparatus comprising a grouping unit and an original remote control which belongs and corresponds to the remote controllable power outlet apparatus, the method comprising:
    receiving a remote control signal;
    determining whether the remote control signal is sent from the original remote control;
    determining a status of the grouping unit according to whether the original remote control has been received by the grouping unit and whether an activation switch has been turned on; and
    selectively activating a remote control grouping function according to determining the status of the grouping unit.

11. The remote control grouping method according to claim 10, wherein selectively activating the remote control grouping function according to determining the status of the grouping unit further comprises causing the remote controllable power outlet apparatus to control at least one controllable socket set to provide a required power or stop providing the required power according to the remote control signal sent from the original remote control.

12. The remote control grouping method according to claim 10, wherein selectively activating the remote control grouping function according to determining the status of the grouping unit comprises if the original remote control has been plugged into the receiving socket of the grouping unit and the activation switch of the grouping unit has been turned on activating the remote control grouping function, allowing for the remote controllable power outlet apparatus to be controlled by another remote control other than the original remote control.

* * * * *